US012676003B2

(12) United States Patent     (10) Patent No.:    US 12,676,003 B2

Benderius                    (45) Date of Patent:       Jul. 7, 2026

---

(54) TRANSMISSION OF A COLLAGE OF DETECTED OBJECTS IN A VIDEO

(71) Applicant: Axis AB, Lund (SE)

(72) Inventor: Björn Benderius, Lund (SE)

(73) Assignee: Axis AB, Lund (SE)

( * ) Notice: Subject to any disclaimer, the term of this patent is extended or adjusted under 35 U.S.C. 154(b) by 56 days.

(21) Appl. No.: 18/435,471

(22) Filed: Feb. 7, 2024

(65) Prior Publication Data

US 2024/0296679 A1     Sep. 5, 2024

(30) Foreign Application Priority Data

Mar. 1, 2023    (EP) ..................................... 23159385

(51) Int. Cl.
| | |
|---|---|
| *G06V 20/52* | (2022.01) |
| *G06T 3/40* | (2006.01) |
| *G06T 5/92* | (2024.01) |
| *G06V 10/56* | (2022.01) |
| *G06V 10/764* | (2022.01) |

(52) U.S. Cl.
CPC ................ *G06V 20/52* (2022.01); *G06T 3/40* (2013.01); *G06T 5/92* (2024.01); *G06V 10/56* (2022.01); *G06V 10/764* (2022.01); *G06T 2207/20132* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 2010/0111196 A1* | 5/2010 | Lynch ...................... | G06T 7/12 |
| | | | 375/E7.005 |
| 2020/0320356 A1* | 10/2020 | Butt ..................... | G06V 10/454 |
| 2022/0138468 A1* | 5/2022 | Edpalm .................. | G06V 20/52 |
| | | | 382/181 |
| 2023/0019360 A1* | 1/2023 | Whatmough .......... | G06V 10/22 |

FOREIGN PATENT DOCUMENTS

| | | |
|---|---|---|
| WO | 2020070479 A1 | 4/2020 |
| WO | 2022140879 A1 | 7/2022 |

OTHER PUBLICATIONS

Novelty Search Report, Uppdragshuset (2022).
Extended European Search Report issued on Jul. 27, 2023 for European Patent Application No. 23159385.6.

* cited by examiner

*Primary Examiner* — Heather R Jones
(74) *Attorney, Agent, or Firm* — Volpe Koenig

(57)             ABSTRACT

A computer-implemented method in a processor device of a camera, the method comprising: acquiring image frames comprising video data, communicating with a receiver device for continuously transmitting a video stream to the receiver device over a communication network; detecting at least one object in the image frames of the video data, the detected at least one object belong to at least one predetermined object class selected as surveillance target; cropping sub-areas in the image frames of the video data, the sub-areas including the at least one detected object, and adding the cropped sub-areas to image frames of the video stream being continuously transmitted as a single video stream to the receiver device.

11 Claims, 5 Drawing Sheets

TRANSMISSION OF A COLLAGE OF DETECTED OBJECTS IN A VIDEO

TECHNICAL FIELD

The present invention generally relates to the field of camera surveillance, and in particular to a method of streaming video data. The present invention further relates to a corresponding control unit, a camera, and a computer program.

BACKGROUND

In various camera surveillance applications, the camera captures and encodes a video stream and transmits the encoded video stream over a communication network with a given bandwidth to for example a server or another remote storage.

For most surveillance applications, the video stream is analyzed for detecting and possibly identifying interesting objects. Detailed object analysis in a real-time video stream requires significant computational power, typically not available in the camera. Therefore, the video stream is analyzed on the server that received the video stream over the communication network.

However, transmitting the video stream to the server for performing object detection and analysis consumes a relatively large portion of the bandwidth.

Accordingly, it is desirable to use the computational power available at a remote server for object analysis while at the same time reduce the consumed bandwidth for transmitting the video stream.

SUMMARY

In view of above-mentioned and other drawbacks of the prior art, it is an object of the present invention to provide an improved method of streaming video data from a camera that alleviates at least some of the drawbacks of prior art.

According to a first aspect of the present invention, it is therefore provided a computer-implemented method in a processor device of a camera, the method comprising: acquiring image frames comprising video data, communicating with a receiver device for continuously transmitting a video stream to the receiver device over a communication network; detecting at least one object in the image frames of the video data, the detected at least one object belong to at least one predetermined object class selected as surveillance target; cropping sub-areas in the image frames of the video data, the sub-areas including the at least one detected object, adding the cropped sub-areas to image frames of the video stream being continuously transmitted as a single video stream to the receiver device.

The present invention is based upon the realization that instead of transmitting a full resolution video stream across the communication network, crops of interesting objects, predefined according to an object class, are added to an already running video stream. Thus, a single video stream is continuously transmitted to a receiver device, and once a new object is detected in the acquired video data, crops of the detected new object is added to frames of the continuously transmitted single video stream. If more than one object of the predetermined classes is simultaneously detected, a crop of each object is added to the video stream, thus forming a collage of crops that is transmitted as the video stream. Once an object is no longer captured in the video data, it is no longer present as a crop in the continuously transmitted video stream.

The computer-implemented method may be performed by the processor device of the camera.

Cropping may be interpreted in its conventional way. Thus, a sub-area, capturing or surrounding the detected object, preferably with as little background as possible, is cut or copied from an image frame of the video data. The cropped sub-area of the image is added to the transmitted video stream. The crop may be polygonal such as for example triangular, rectangular, or square. For example, it is envisaged that the sub-area is the smallest possible rectangular crop that surrounds the entire detected object.

The video stream is continuously pushed across the communication network when new image frames are produced. That is, the video stream is a continuous stream of image frames that are streamed at the rate that they are produced, to the receiver device. The video stream is transmitted to the receiver device regardless of any detected objects in the acquired video data. If no objects are detected, no objects are shown in the video stream which may instead include predetermined image frames.

A video stream is generally a set of consecutive image frames captured over time. The consecutive image frames collectively form the video stream.

The bandwidth of the communication network may be defined as the present capacity in bits per unit time that the communication network can transmit.

Although the preferred embodiment is that only the video stream comprising crops is transmitted, it is envisaged that also a full content resolution video stream is transmitted across the communication network to a receiver device. For example, the video stream with crops may be transmitted to a receiver device for analysis such as detection and identification of objects whereas the full resolution video stream may be transmitted to another receiver device for storage.

According to an embodiment, the method may comprise detecting more than one object in the same image frame of the video data, and adding cropped sub-areas of the more than one detected object to the same image frame of the video stream. Advantageously, a single video stream is used and transmitted regardless of the number of detected objects. Thus, no further video streams are added for additionally detected objects in the video data.

According to an embodiment, a remaining area of the image frames of the video stream, other than the added cropped sub-areas, include predetermined content. In this way, the required bandwidth is reduced. For example, predetermined content may be a monochrome background, such as a predetermined color level, or a static predetermined pattern, or predetermined static content, that requires little encoding and produces relatively small amounts of data that consumes bandwidth. It is envisaged that the remaining area may be of a single color.

In some possible implementations the remaining area may further be of the same, tint, shade, and tone, for example entirely black.

The predetermined content should be independent from the image data of the acquired video data. That is, the predetermined content of the video stream is unrelated to, or decoupled from, the acquired video that may optionally be used for forming other video streams.

According to an embodiment, the method may comprise scaling the cropped sub-areas before adding them to the video stream. By downscaling the size, the cropped sub-areas advantageously reduce the amount of data to be transferred and thus requires less bandwidth. The crops may be individually scaled and not necessarily scaled in the same way. For example, one crop may be scaled according to one scaling parameter and another crop may be scaled according to another scaling parameter.

According to an embodiment, the method may comprise performing at least one of color adjustment and tone mapping to the cropped sub-areas before adding them to the video stream. For example, white balance (or e.g., grey balance) adjustment of individual sub-areas may be applied to reduce the needed bandwidth for transmitting the video stream and to adapt the cropped sub areas to improve the analysis performed on the receiver device.

The color adjustment and/or tone mapping may be performed differently to different crops. For example, color adjustment and/or tone mapping may be performed according to first color adjustment setting and/or a first tone mapping setting to a first crop. Color adjustment and/or tone mapping may be performed according to a second color adjustment setting and/or a second tone mapping setting to a second crop. The first settings are not the same as the second settings.

According to an embodiment, the predetermined object classes may include classes with moving objects. Moving objects may be particularly interesting in many surveillance applications.

According to an embodiment, the predetermined object classes may include at least one of a people class, a vehicle class, and a biometric object class. A biometric class may for example be faces. A vehicle may be identified on the receiver device by analyzing the license plates of the vehicles. Similarly, a person may be identified using identification software on the receiver device, the software being configured to analyze the face of the person.

According to an embodiment, in the absence of detected objects in acquired video data, the image frames of the video stream include predetermined content. In other words, in the absence of detected objects, the entire image frame of the video stream is considered a remaining area that is computationally efficient to encode. The image frames may then be entirely monochrome, of a predetermined pattern, of a single color, or of the same, tint, shade, and tone, for example entirely black. It is envisaged that in the absence of detected objects in acquired video data, the image frames of the video stream include only the predetermined content.

According to an embodiment, the resolution of the image frames of the video stream may be fixed. The resolution is large enough to accommodate an expected maximum number of detected objects. The maximum number of objects depends on the implementation at hand, such as the typical occupancy in the scene captured by the camera. This resolution is set by a user with knowledge of the scene and may be tuned to better fit a present implementation.

By using a single standard video stream of fixed resolution increasing the complexity of the camera-receiver device interaction/infrastructure can be avoided while still saving network bandwidth and receiver device resources.

According to an embodiment, the location of the cropped sub-areas in the image frames of the video stream may correspond to a location of the detected object in the image frames of the acquired video data. Thus, as the detected object changes position in the image frames of the acquired video data, the cropped sub-area changes position correspondingly in the video stream. This provides improved correspondence between image frames of the acquired video data and the video stream.

According to an embodiment, the location of the cropped sub-areas in the image frames of the video stream for a given detected object may be fixed. This advantageously facilitates locating the objects in the video stream by the receiver device, thereby saving receiver device resources. It may also reduce network bandwidth consumption.

According to a second aspect of the present invention, there is provided a control unit arranged to perform the method of the first aspect and embodiments thereof.

Further embodiments of, and effects obtained through this second aspect of the present invention are largely analogous to those described above for the first aspect of the invention.

According to a third aspect of the present invention, there is provided camera comprising an input and output interface to communicate with a receiver device over a communication network, and a control unit according to the second aspect.

The camera may be a surveillance network camera.

Further embodiments of, and effects obtained through this third aspect of the present invention are largely analogous to those described above for the first aspect and the second aspect of the invention.

According to a fourth aspect of the present invention, there is provided a computer program product comprising program code for performing, when executed by a control unit, the method of any of the herein discussed embodiments.

Further embodiments of, and effects obtained through this fourth aspect of the present invention are largely analogous to those described above for the other aspects of the invention.

According to a fifth aspect of the present invention, there is provided a computer-implemented method on a server, the method comprising: communicating with a camera over a communication network for continuously receiving a video stream from the camera; receiving the video stream from the camera, the video stream comprising a set of image frames including cropped sub-areas of objects on a predetermined background, identifying the cropped sub-areas in the image frames of the video stream; identifying the objects in the cropped areas; and providing a signal indicating the identified objects.

The requirements of the computational resources on the server can be used more efficiently since there is no need to analyze an entire full resolution video for detecting objects. Instead, a control unit on the server need only be configured to detect the cropped sub-areas which are known to include an already confirmed detected object. The server may then use its resources to make more detailed analysis of the detected objects.

Further embodiments of, and effects obtained through this fifth aspect of the present invention are largely analogous to those described above for the other aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
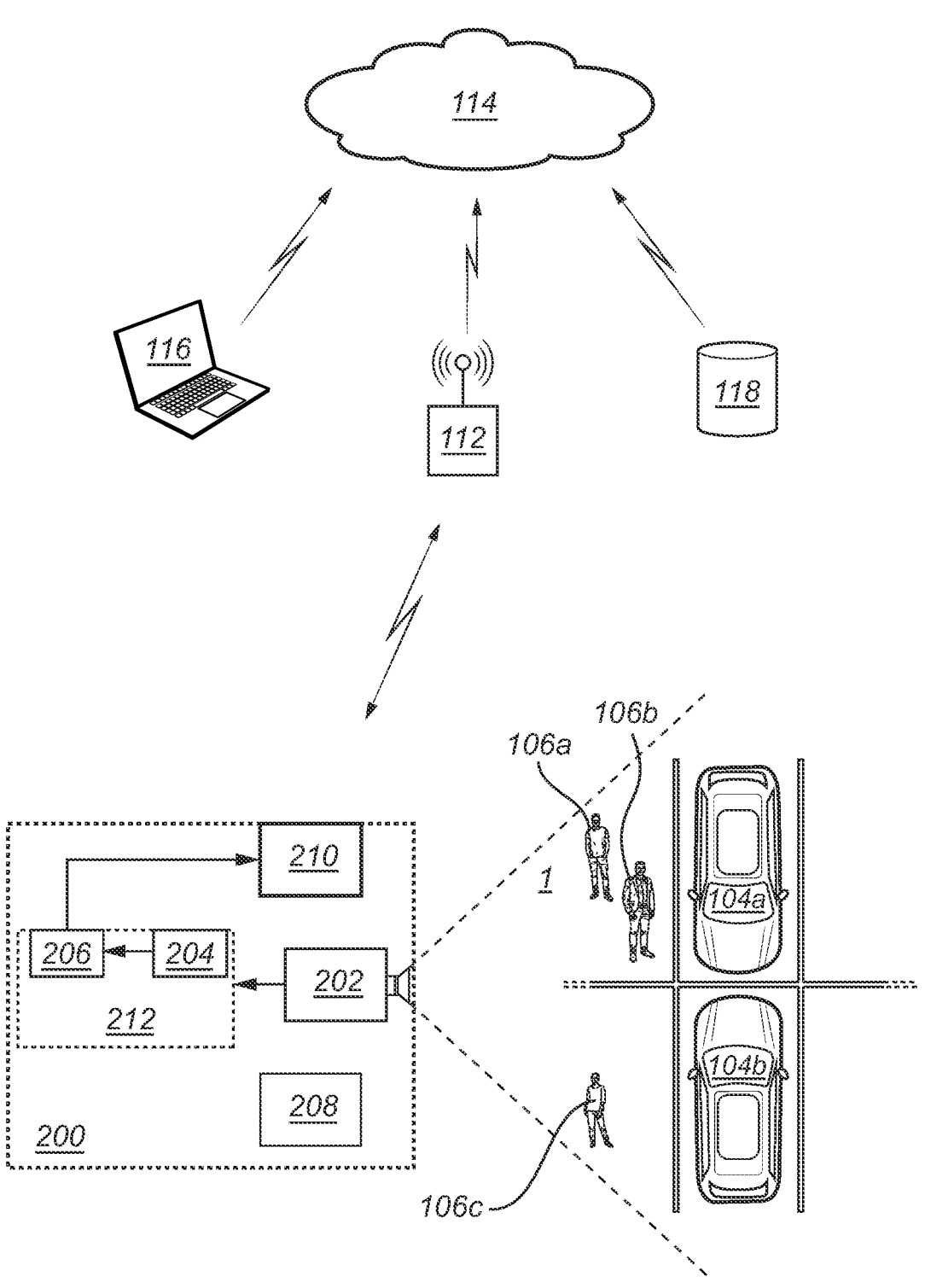
FIG. 1 schematically illustrates an example application of embodiments of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is shown a scene 1 being monitored by an image acquisition device 200, e.g., a network camera or more specifically a network surveillance camera. In the scene 1, there is a set of objects 104*a*, 104*b*, that may be for example vehicles in a parking lot, and persons 106*a-c*.

The camera 200 may be mounted on a building, on a pole, or in any other suitable position depending on the specific application at hand. Further the camera 200 may be a fixed camera or a movable camera such as pan, tilt and zoom, or even a body worn camera. Further, the camera 200 may be a visible light camera, an infrared (IR) sensitive camera or a thermal (long-wavelength infrared (LWIR)) camera. Further, image acquisition devices employing LIDAR and radar functionalities may also be conceivable.

The camera 200 is continuously monitoring the scene 1 by capturing video data for forming a video stream of the scene 1. The scene 1 that is within the field of view of the camera 200 is here exemplified as including the objects 104*a-b* and people 106*a-c*. The camera 200 may transmit a video stream over a communication link 112 connected to a communication network 114 having a transmission capacity, i.e., a bandwidth, to a receiver device in the form of a client 116 or a server 118 where video stream may be stored, analyzed, and/or observed by a user as a live stream.

The camera 200 further comprises an image capturing module 202, an image processing pipeline 204, an encoder 206, an optional non-volatile memory storage device 208, and an input and output interface 210 configured as a communication interface between the camera 200 and the communication network 114 via the communication link 112.

The image capturing module 202 comprises various components such as a lens and an image sensor, where the lens is adapted to project an image onto the image sensor comprising multiple light sensitive pixels.

The image processing pipeline 204 is configured to perform a range of various operations on image frames received from the image sensor. Such operations may include filtering, demosaicing, color correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc. However, it should be noted that some of these operations, e.g., transformation operations, such as correction of barrel distortion, rotation, etc., may be performed by one or more modules, components or circuits arranged outside the image processing pipeline 204, for example in one or more units between the image processing pipeline 204 and the encoder 206.

Generally, following the image processing pipeline 204, the image frames are forwarded to the encoder 206, in which the image frames are encoded according to an encoding protocol and forwarded to a receiver device, e.g., the client 116 and/or the server 118, over the communication network 114 using the input/output interface 210.

It should be noted that the camera 200 illustrated in FIG. 1 also includes numerous other components, such as processors, additional memories, etc., which are common in conventional camera systems and whose purpose and operations are well known to those having ordinary skill in the art. Such components have been omitted from the illustration and description of FIG. 1 for clarity reasons.

There are a number of conventional video encoding formats. Some common video encoding formats that work with the various embodiments of the present invention include: JPEG, Motion JPEG (MJPEG), High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

The image processing pipeline 204 and the encoder 206 may be operative on a control unit 212. The camera 200 preferably comprises the control unit 212 and are provided as a single unit with a common housing. However, it is envisaged that the control unit 212 may be a separate stand-alone control.

When monitoring the scene 1, the camera 200 continuously captures video data using the image capturing module 202, optionally processes the image frames in the image processing pipeline 204, encodes the processed data in encoder 206 to form a full video stream. The full video stream includes full video data and therefore requires relatively large bandwidth in the communication network 114.

To alleviate this problem and reduce the required bandwidth, the inventors propose a method performed in the camera so that less data is transmitted across the network while still allowing detailed object detection and identification to be performed on the receiver device 116, 118. Furthermore, although the control unit 212 of the camera 200 may perform object detection to some extent, more powerful processing resources is typically required for more detailed analysis. Therefore, the camera 200 needs external processors, accessible through the communication network 114 for more detailed video analysis. These problems are addressed by embodiments of the present disclosure and will now be discussed in more detail.

Figure 2:
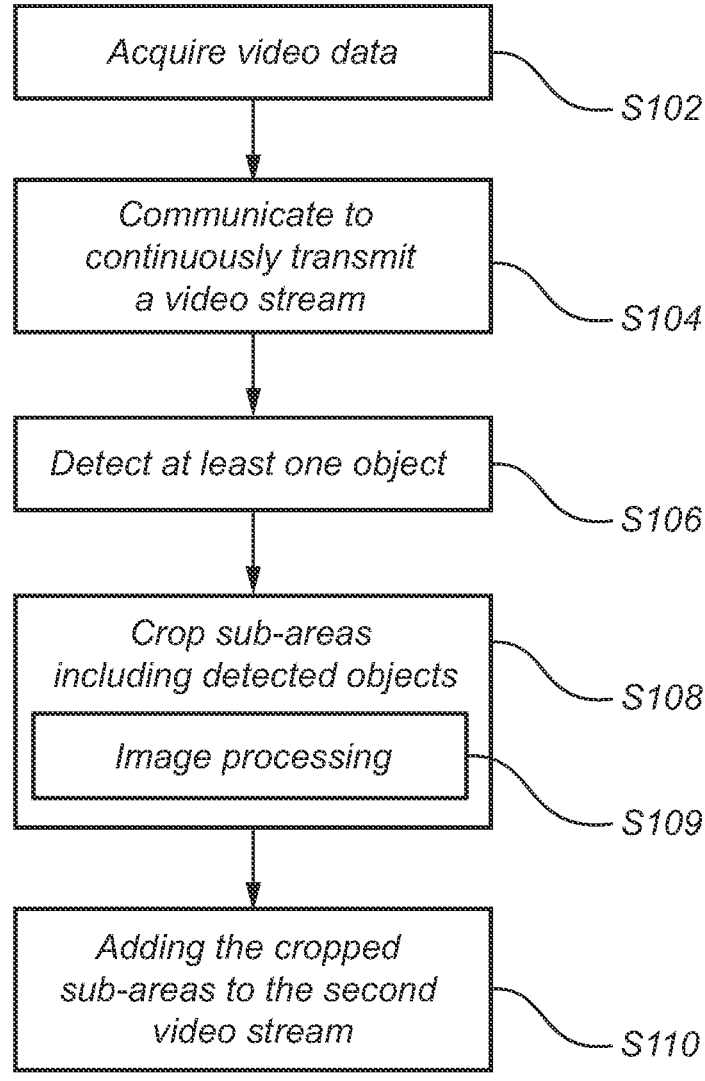
FIG. 2 is a flow-chart of method steps according to embodiments of the invention.
Figure 4:
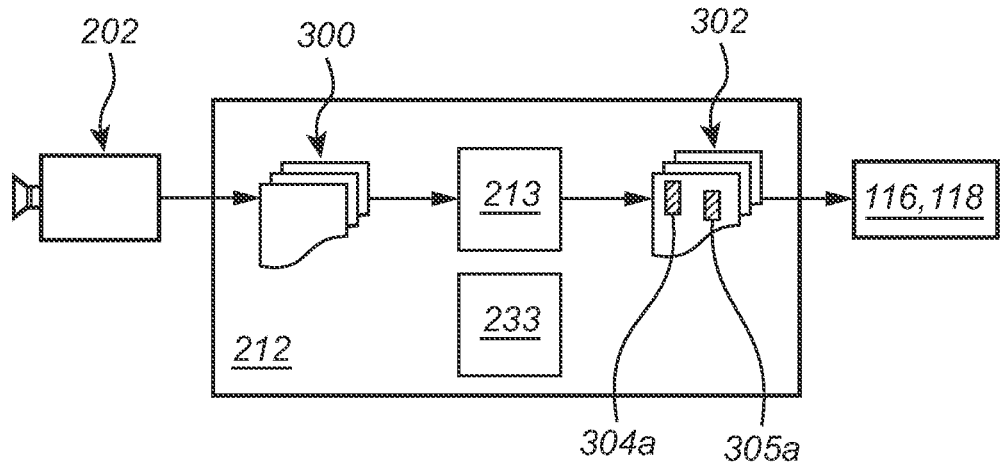
FIG. 4 is block-diagram of a control unit, camera, and receiver device according to embodiments of the invention.

FIG. 2 is a flow-chart of method steps according to embodiments of the invention and FIG. 4 is a block diagram of a control unit 212 comprising processing circuitry 213 for performing the method steps.

In step S102, the control unit 212 acquires image frames comprising video data captured by the image capturing module 202. The image frames are continuously acquired as the image capturing module 202 captures new image data.

The video data may be raw data from the image capturing module 202 with some pre-processing, but without encoding.

Figure 3:
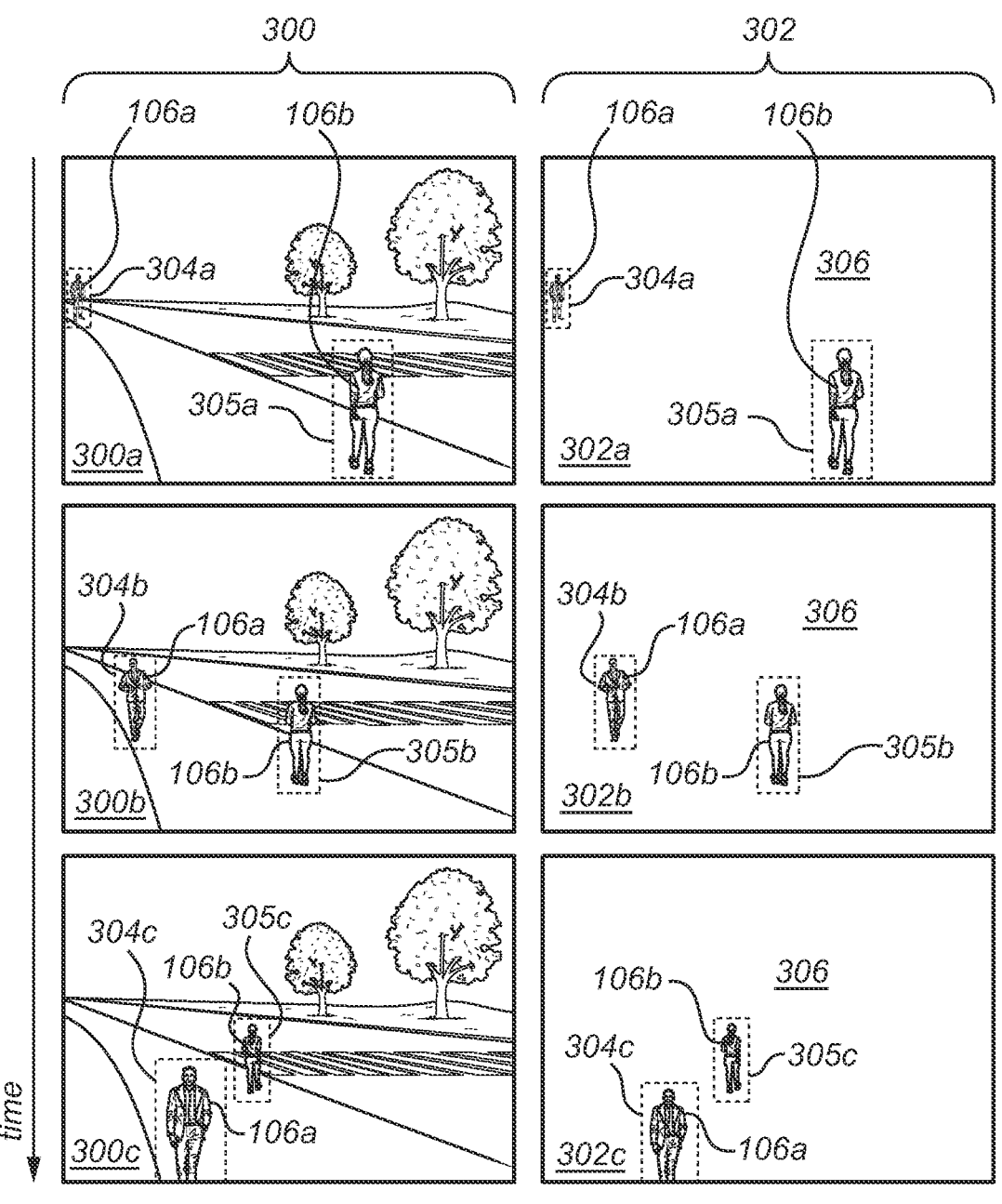
FIG. 3 schematically illustrates image frames of acquired video data and a video stream according to embodiments of the invention.

FIG. 3 schematically illustrates a set of image frames 300a, 300b, 300c of the acquired video data 300.

In the frames 300a-c, objects in the form of people 106a and 106b are present. Timewise, image frame 300a is the first image frame and image frame 300c is the last of the image frames 300a-c.

The persons 106a, and 106b have moved between subsequent image frames, that is, person 106a has moved in the second image frame 300b compared to its location in the first image frame 300a. Analogously, the person 106a has moved in the third image frame 300c compared to its location in the second image frame 300b. Furthermore, the person 106b has also moved between image frames 300a-c. The image frames 300a-c are shown as examples and are not necessarily directly consecutive. The amount of motion between image frames 300a-c is here only exemplified and somewhat exaggerated for clarity.

The image data 300 may include the full video data captured by the image capturing module 202, thus including the entire background here showing e.g., trees, sky, a road, sidewalk, etc. The image data 300 requires relatively large bandwidth for transmission once encoded to a full video stream to a receiver device 116, 118.

Turning again to the flow-chart in FIG. 2 and the block diagram in FIG. 4.

In step S104, communicating, by the control unit 212, with a receiver device 116, 118 for continuously transmitting a video stream 302 to the receiver device 116, 118 over a communication network 114. The control unit 212 may have a continuous communication using the communication interface 210 between the camera 200 and the communication network 114 via the communication link 112. The control unit 212 continuously provide image frames of the video stream 302 to the receiver device 116, 118, for example to the server 118. This means that the image frames of the video stream 302 are transmitted at the rate that they are produced in the camera 200 as a continuous stream of image frames. The control unit 212 thus establishes communication with the server 118 so that the image frames of the video stream 302 are continuously pushed to the server 118 across the communication network 114. The video stream 302 is a single continuous encoded video stream.

In step S106, detecting, by the control unit 212, at least one object 106a, 106b in the image frames of the. The detected at least one object 106a-b belong to at least one predetermined object class selected as surveillance target. The predetermined object classes may include classes with moving objects. In some specific implementations the predetermined object classes include at least one of a people class, a vehicle class, and a biometric object class, such as a class for human faces. Generally, the predetermined object class may be classes that may include intended targets for surveillance.

In step S108, the control unit 212 crops sub-areas 304a-c, 305a-c in the image frames 300a-c of the acquired video data 300, the sub-areas 304a-c, 305a-c including the detected objects 106a-b.

Turning again to FIG. 3, the control unit 212 has detected object 106a and object 106b in image frames 300a-c. In each of the image frames 300a-c, where the objects 106a-b are detected, a crop around that object in the image frames 300a-c is made. For example, in image frame 300a, a crop 304a captures the sub-area of the detected object 106a, and a crop 305a captures the sub-area of the detected object 106b. Further, in image frame 300b, a crop 304b captures the sub-area of the detected object 106a, and a crop 305b captures the sub-area of the detected object 106b. In image frame 300c, a crop 304c captures the sub-area of the detected object 106a, and a crop 305c captures the sub-area of the detected object 106b. In this example, the control unit 212 has detected more than one object 106a-b in the same image frame of the video data 300. It is of course envisaged that a single object is detected.

In step S110, the control unit 212 adds the cropped sub-areas 304a-c, 305a-c to image frames 302a-c of the video stream 302 that is continuously transmitted as a single video stream to the receiver device 116, 118, e.g., to server 118 via the communication network 114 schematically illustrated in FIG. 1 but omitted in the block diagram of FIG. 4. Once the crops are added, the image frames of the single video stream are processed, encoded and transmitted.

In FIG. 3, cropped areas 304a-c and 305a-c of the more than one detected object 106a-b are added to the same image frames 302a-c of the video stream. Thus, each image frame 302a-c comprise more than one crop. Note that each crop includes a single detected object only.

The image frames of the acquired video data 300 are continuously produced in the camera 200, but it is preferably only the collage of crops in the video stream 302 that is transmitted as a continuous stream to the receiver device 116, 118, thereby reducing the required bandwidth.

To further reduce used bandwidth, remaining areas 306 of the image frames 302a-c of the video stream, other than the added cropped sub-areas 304a-c, 305a-c, include predetermined content. For example, the remaining area 306 may be considered the background of the image frames 302a-c of the video stream 302 and may be made in a single color, e.g., a black background, or a static pattern. This allows the remaining area 306 to be computationally efficient to encode. Furthermore, using a single color or otherwise monochrome background reduces the used bandwidth when transmitting the video stream 302. Thus, the image frames 302a-c of the video stream 302 may include the crops 304a-c, 305a-c on a single-color background 306.

Moreover, the video stream 302 is continuously transmitted, even in the absence of detected objects in acquired video data 300. In such case, in the absence of detected objects in the acquired video data 300, the image frames 302a-c of the video stream 302 include only the predetermined content, e.g., including only the predetermined background 306 of e.g., a single color.

In optional step S109, the control unit 212 may perform image processing to further reduce the bandwidth used for transmitting the video stream 302. In addition, the image processing may advantageously optimize the image of a detected object for further analysis by the receiver device 116, 118. Thus, image processing may be adapted to the analysis technique used by the receiver device 116, 118 to improve the outcome of the further analysis.

For example, the control unit 212 may perform color adjustment and/or tone mapping to the cropped sub-areas 304a-c, 305a-c before adding them to the video stream 302. Such color adjustments may include adjusting the white balance of the cropped areas or scaling the cropped sub-areas before adding them to the video stream.

Scaling may be performed to reduce the resolution to save bandwidth. For example, in FIG. 3, the crop 304c in image frame 300c of the acquired video data may be scaled down in size in image frame 302c of the video stream 302.

Preferably, the resolution of the image frames of the video stream 302 is fixed. This means that the size of the image frames 302*a-c* is fixed but large enough to fit the cropped sub-areas 304*a-c*, 305*a-c*. If the total size of the cropped sub-areas 304*a-c*, 305*a-c* exceeds that of the present image frame of the video stream 302, the largest cropped sub-areas may be down-scaled, wherein the resulting total size of the cropped sub-areas is below the total size of the image frame of the video stream 302.

The location of the cropped sub-areas in the image frames of the video stream for a given detected object may be fixed. The initial position once the cropped area of a detected object is detected may be predetermined according to a priority list or it may be randomized, or it may be based on the position of the first instance of the detected object.

In other possible implementations, the cropped sub-areas in the video stream may move as the object moves in the image frames of the acquired video data 300. For example, the location of the cropped sub-areas 304*a-c*, 305*a-c* in the image frames of the video stream 302 correspond to a location of the detected object in the image frames of the video data 300.

The control unit 212 may have access to a computer program 233 comprising instructions which, when the program is executed by the control unit 212, cause the control unit 212 to carry out the method of any one of the methods described herein.

Figure 5:
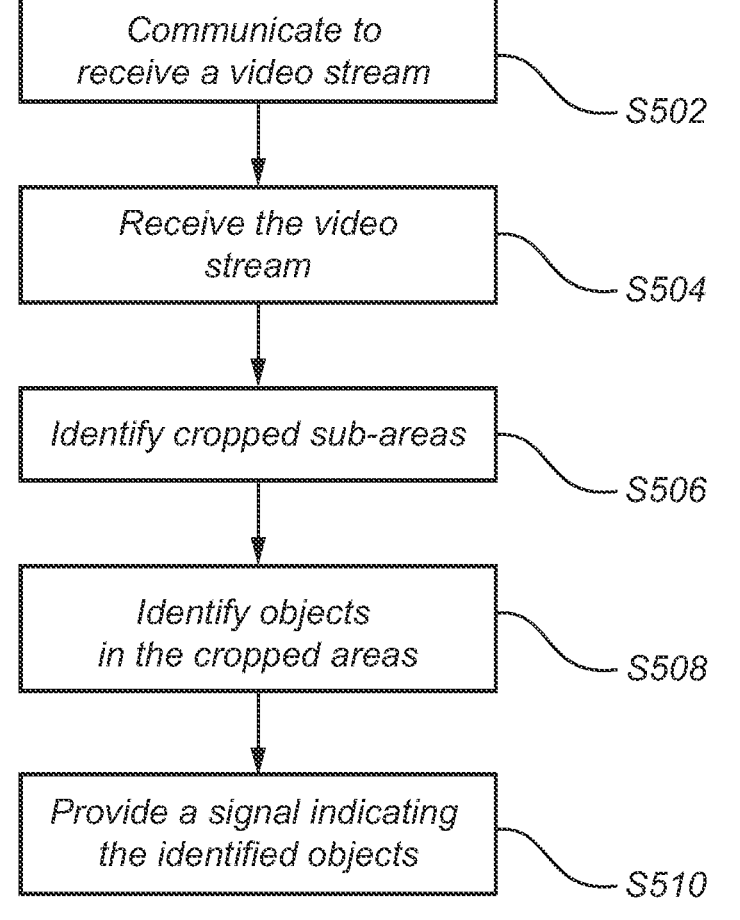
FIG. 5 is a flow-chart of method steps according to embodiments of the invention.
Figure 6:
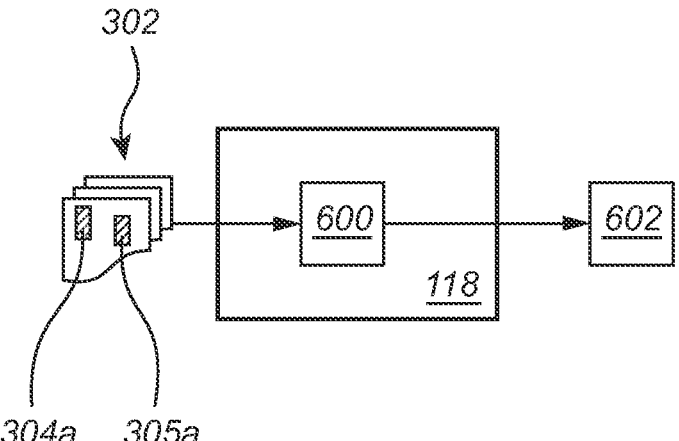
FIG. 6 is block-diagram of a server according to embodiments of the invention.

FIG. 5 is a flow-chart of method steps according to a further aspect of the invention. FIG. 5 will be described in conjunction with FIG. 6 which is a block-diagram of a server comprising processing circuitry for performing the method of FIG. 5.

The computer-implemented method is performed by the processing circuitry 600 on the server 118, and comprises, in step S502, communicating with a camera over a communication network for continuously receiving a video stream 302 from the camera.

In step S504, receiving the video stream 302 from the camera. The video stream comprising a set of image frames including cropped sub-areas 304*a*, 305*a* of objects on a background with predetermined content.

In step S506, identifying the cropped sub-areas 304*a-c*, 305*a-c* in the image frames of the received video stream 320. The cropped sub-areas 304*a-c*, 305*a-c* may be detected by pre-received knowledge of where in the image frames the cropped sub-areas 304*a-c*, 305*a-c* are found, or by running a detection algorithm for finding the crops on the background including predetermined content. In case of receiving information of the location, such information may be received in meta data of the transmitted video stream.

In step S508, identifying the objects in the cropped areas. Identification may be based on biometrics or by detecting signs such as license plates, or other identification details specific to e.g., humans or vehicles.

In step S510, providing a signal 602 indicating the identified objects. The signal 602 includes the outcome of the identification in step S508.

Various types of object detection techniques and algorithms are known per se and the present invention is not limited to any particular algorithm, model, or technique. Some example object detection techniques include neural networks, pattern recognition, classification techniques, Object detection algorithms may be operative in the image processing pipeline 204.

The embodiments described herein are based on cropping sub areas on the video frames of the acquired video data and adding the crops to an already running video stream. Another possible way to achieve the same result related to reducing the bandwidth, is to form a full content video stream using the acquired video data, detect objects, and mask areas of the image stream surrounding the sub-areas with detected objects. For example, in a full content video stream, areas not including objects of the predetermined object classes, may in this case be masked or otherwise filled with predetermined content such as a single color background.

The control unit includes a microprocessor, microcontrol unit, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer-implemented method in a processor device of a network surveillance camera mounted to a building or a pole and arranged to monitor a scene, the method comprising:

acquiring, by the camera, one or more image frames comprising video data;

communicating, by a processor device of the camera, with a receiver device for continuously transmitting a video stream comprising predetermined content to the receiver device over a communication network, the receiver device comprising more powerful processing resources than the processor device;

detecting, by the processor device, more than one object in the same image frame comprising the video data, the detected more than one object belonging to at least one predetermined object class selected as surveillance target;

cropping, by the processor device, one or more sub-areas in the one or more image frames comprising the video data to provide one or more cropped sub-areas each including one of the detected objects;

determining that the total size of the one or more cropped sub-areas exceeds that size of a present image frame of the video stream;

downscaling at least the largest of the cropped sub-areas so that the resulting total size of the one or more cropped sub-areas is below the total size of the image frame of the video stream; and adding, by the processor device, the one or more cropped sub-areas to the present image frame being continuously transmitted as a single video stream to the receiver device, wherein the locations of the one or more cropped sub-areas in the image frames of the video stream for a given detected object is fixed and predetermined based on a priority list of positions, wherein a remaining area of the video stream image frames, which is an area other than the one or more cropped sub-areas added to the video stream image frames, includes the predetermined content, and wherein, in the absence of detected objects in the one or more image frames comprising the video data, the video stream image frames include only the predetermined content.

2. The computer-implemented method of claim 1, comprising:

performing at least one of color adjustment and tone mapping to the one or more cropped sub-areas before adding them to the video stream.

3. The computer-implemented method of claim 1, wherein the at least one predetermined object class comprises a class with moving objects.

4. The computer-implemented method of claim 1, wherein the at least one predetermined object class comprises at least one of a people class, a vehicle class, and a biometric object class.

5. The computer-implemented method of claim 1, wherein a resolution of the video stream image frames is fixed.

6. The computer-implemented method of claim 1, wherein the one or more image frames comprising video data are continuously acquired from a camera 200 and the one or more cropped sub-areas are added as a collage of crops in the video stream image frames that are continuously transmitted as the single video stream to the receiver device to reduce a required bandwidth.

7. The computer-implemented method of claim 1, wherein the remaining area comprises a single color, background, or static pattern to provide computational efficiency for encoding the single video stream.

8. A control unit comprising processing circuitry in association with a network surveillance camera mounted to a building or a pole and arranged to monitor a scene, the control unit comprising:

an interface acquiring one or more image frames comprising video data, a transmitter for communicating with a receiver device for continuously transmitting a video stream comprising predetermined content to the receiver device over a communication network, the receiver device comprising more powerful processing resources than the control unit;

a processor for:

detecting more than one object in the same image frame of the video data, the detected more than one object belonging to at least one predetermined object class selected as surveillance target, cropping one or more sub-areas in the image frames of the video data, the one or more sub-areas each including one of the detected objects, determining that the total size of the one or more cropped sub-areas exceeds that size of a present image frame of the video stream, downscaling at least the largest of the one or more cropped sub-areas so that the resulting total size of the one or more cropped sub-areas is below the total size of the image frame of the video stream, and adding the one or more cropped sub-areas to the present image frame of the video stream being continuously transmitted as a single video stream to the receiver device, wherein the locations of the one or more cropped sub-areas in the image frames of the video stream for a given detected object is fixed and predetermined based on a priority list of positions, wherein a remaining area of the image frames of the video stream, other than the added one or more cropped sub-areas include the predetermined content, and wherein, in the absence of detected objects in the one or more image frames comprising the video data, the image frames of the video stream include only the predetermined content.

9. The control unit of claim 8, further comprising:

an input and output interface to communicate with a receiver device over the communication network.

10. A computer-implemented method on a server, the computer-implemented method comprising:

communicating with a network surveillance camera over a communication network for continuously receiving a video stream from the camera;

receiving the video stream from the camera, the video stream comprising a set of image frames including one or more cropped sub-areas of objects on a background with predetermined content, wherein, in the absence of the one or more cropped sub-areas of the objects, the set of image frames of the video stream include only the predetermined content, wherein the largest of the cropped sub-areas are downscaled so that the resulting total size of the cropped sub-areas is below the total size of the image frame of the video stream, wherein the locations of the cropped sub-areas in the image frames of the video stream for a given detected object is fixed and predetermined based on a priority list of positions, identifying the one or more cropped sub-areas in the set of image frames of the video stream;

identifying the objects in the one or more cropped areas; and providing a signal indicating the identified objects.

11. A camera comprising an input and output interface to communicate with a receiver device over a communication network, and a control unit of claim 8.

* * * * *